UNITED STATES PATENT OFFICE.

JAMES MACTEAR, OF GLASGOW, SCOTLAND.

IMPROVEMENT IN MANUFACTURE OF GRANULATED CRYSTALLINE CARBONATE OF SODA.

Specification forming part of Letters Patent No. 195,142, dated September 11, 1877; application filed July 21, 1877. Patented in England, May 8, 1875, for fourteen years.

*To all whom it may concern:*

Be it known that I, JAMES MACTEAR, of Glasgow, Scotland, of the firm of Charles Tennant & Co., of Glasgow and Newcastle-on-Tyne, Great Britain, manufacturing chemists, make known that I have invented a Process for Obtaining an Improved Crystalline Sal-soda or Soda-Carbonate, and that the following is a full and particular specification of my invention for which I have obtained English Letters Patent No. 1,714 of A. D. 1875, May 8.

My invention consists of an improved combination of processes which, while being such as to dispense with a part of the operations hitherto employed in the manufacture of soda, and to purify the soda more conveniently and economically than heretofore, and so to more completely separate soda-sulphate, at the same time yields the sal-soda or soda-carbonate in a granular and minutely-crystalline condition, in which it is much more convenient for general use than when in the large hard masses in which it has hitherto been supplied.

My invention is applicable to the ordinary "vat-liquor" of the soda manufacture, which liquor I first treat with carbonic acid until the caustic soda is carbonated, and silica, alumina, and iron are thrown down. Any excess of carbonic acid may be taken up by the addition of untreated liquor. The liquor, decanted or otherwise separated from the precipitated matters, if not already strong enough, is then boiled or concentrated so as to crystallize on cooling, so that the sal-soda may separate in a fine granular condition. The granulated sal-soda, after being separated from the remaining liquor, is washed, and most of the impurities not left in the liquor are thereby removed. The remaining liquor, after being again treated with carbonic acid, if necessary, is boiled down to the salting-point and again agitated while cooling, so as to obtain a further supply of granulated sal-soda, which is purified by washing, like the first quantity.

The same treatment may be repeated a third time, if found desirable. The liquor still remaining, and which will contain most of the soda-sulphate and impurities, may be finally boiled down nearly or quite to dryness, and the resulting salts may be decomposed in the ball-furnace, as commonly practised with fresh soda-sulphate.

In a similar manner what are known as "red liquors" of the soda manufacture, and also the mother liquors from which the ordinary soda crystals have been separated, may be first treated with carbonic acid, any excess of which can be taken up by adding untreated liquor, and then, after boiling down, if necessary, be agitated while cooling or crystallizing, so as to yield the sal-soda in a finely-granulated condition, as before. The boiling down and granulation are to be repeated until most of the sal-soda is withdrawn, after which the remaining liquor, containing principally soda-sulphate, is to be boiled down and the salt decomposed, as before directed.

The washed or unwashed granulated sal-soda, obtained as hereinbefore described, may be subsequently treated in various ways, a calcination and attendant processes being in all cases saved, as compared with existing processes.

What I claim as my invention is—

1. The within-described process of making granulated crystalline sal-soda—that is to say, by first carbonating the "vat," or "red," or similar liquor, and then concentrating and cooling it under agitation, substantially as described.

2. The process herein set forth of utilizing the residuary liquid—that is to say, by boiling it down and then decomposing it, as set forth.

In testimony whereof I have signed my name to this specification in the presence of two subscribing witnesses.

JAMES MACTEAR.

Witnesses:
 EDMUND HUNT,
 LOCK MOORE.